US008805193B2

(12) United States Patent
Forster et al.

(10) Patent No.: US 8,805,193 B2
(45) Date of Patent: Aug. 12, 2014

(54) REMOTELY POWERED OPTICAL OUTPUT LABELS

(75) Inventors: Ian J. Forster, Essex (GB); Craig W. Potter, Mentor, OH (US); Victor P. Holbert, Newbury, OH (US)

(73) Assignee: Avery Dennison Corporation, Glendale, CA (US)

( * ) Notice: Subject to any disclaimer, the term of this patent is extended or adjusted under 35 U.S.C. 154(b) by 645 days.

(21) Appl. No.: 13/029,384

(22) Filed: Feb. 17, 2011

(65) Prior Publication Data

US 2012/0212149 A1 Aug. 23, 2012

(51) Int. Cl.
*H04B 10/00* (2013.01)

(52) U.S. Cl.
USPC ........ 398/130; 398/140; 398/212; 340/13.26; 340/815.45

(58) Field of Classification Search
USPC ..................... 340/13.2, 13.26, 13.24, 815.45; 455/127.1, 129; 398/130, 140, 212
See application file for complete search history.

(56) References Cited

U.S. PATENT DOCUMENTS

| | | | | |
|---|---|---|---|---|
| 6,084,512 | A * | 7/2000 | Elberty et al. | 340/572.1 |
| 6,961,005 | B2 * | 11/2005 | Clement et al. | 340/870.07 |
| 7,453,357 | B2 * | 11/2008 | Bernal-Silva et al. | 340/539.32 |
| 7,518,515 | B2 | 4/2009 | Trosper | |
| 7,728,734 | B2 * | 6/2010 | Arai et al. | 340/572.7 |
| 7,889,080 | B2 * | 2/2011 | Chan | 340/572.1 |
| 2005/0068155 | A1 * | 3/2005 | Caruana | 340/10.1 |
| 2008/0186178 | A1 | 8/2008 | Tuttle et al. | |
| 2010/0207506 | A1 | 8/2010 | Kwon | |

* cited by examiner

*Primary Examiner* — Thuy Vinh Tran
(74) *Attorney, Agent, or Firm* — Avery Dennison Corporation

(57) ABSTRACT

According to one exemplary embodiment, an apparatus, system and method for a remotely powered optical output label is disclosed. The system includes a transmitting device including at least one transmitting antenna and a power source. A receiving label is in remote communication with the transmitting device, the receiving label including a receiving antenna and a capacitor connected to at least one optical element. The optical element may be selectively controlled and powered to variably emit light using energy transmitted by the transmitting device.

8 Claims, 4 Drawing Sheets

REMOTELY POWERED OPTICAL OUTPUT LABELS

FIELD OF THE INVENTION

The present invention is in the field of visual indicators and more specifically in the field of radio frequency enabled device to generate optical signals.

BACKGROUND OF THE INVENTION

The visual appeal of labels and promotional display material is often a key factor in getting consumers to notice, and potentially buy, a product. Therefore, methods and techniques that add visual appeal to a product can potentially be very valuable. For example, retail products having labels that variably emit light or otherwise change optical properties when a customer is in the vicinity may attract an otherwise uninterested customers to the product.

Generally, construction of such labels may include a transmitting device, a receiving device and some type of optical element controlled by a power source. Often times however, variably improving the visual appeal of a product utilizing such labels is not cost effective. For example, the cost of attaching an individual label to each of a number of relatively inexpensive articles may outweigh the benefits of increased attention to the product. More advanced methods such as the ability to wirelessly control the visual output and integrating intelligent elements with the optical element only further serve to increase the expense.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

According to one exemplary embodiment, an apparatus, system and method for a remotely powered optical output label is disclosed. The system can include a transmitting device including at least one transmitting antenna and a power source. A receiving label may be in remote communication with the transmitting device, the receiving label including a receiving antenna to at least one optical element. The optical element may be selectively controlled and powered to variably emit light using energy transmitted by the transmitting device.

In a further exemplary embodiment of the presently described invention, an optical output label is described and includes a transmitting device that has at least one transmitting antenna and a power source. The output label includes at least one receiving label in remote communication with the transmitting device with the at least one receiving label including a receiving antenna and a capacitor connected to at least one optical element.

In a still further exemplary embodiment of the presently described invention, a method of variably controlling the optical output of a label is provided and includes the steps of initially arranging the capacitance of an optical element to be resonant with a receiving antenna of a receiving label at a first frequency. Then, transmitting energy from a remote transmitting device at the first frequency. Next, receiving energy from the transmitting device at the receiving antenna at the first frequency in order to activate the optical element. Then, selectively controlling the output of the optical element by varying factors associated with the energy transmitted by the transmitting device.

In a yet still further exemplary embodiment of the presently described invention, a method for producing a plurality of optical output labels, is presented and initially includes the steps of forming a plurality of light cells on a single roll of material in grid form, with each light cell having at least one antenna and at least one light emitting element. Then, separating at least one of the plurality of light cells from the roll to form a label having an optical output.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION OF THE INVENTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

Generally referring to FIGS. 1-6, an apparatus, method and system for labels, such as RFID labels, with an optical output or variable optical properties may be described. The apparatus, method and system can include, for example, labels, tickets and other forms of trim and marking for enhancing the visual appeal of retail products.

Figure 1:
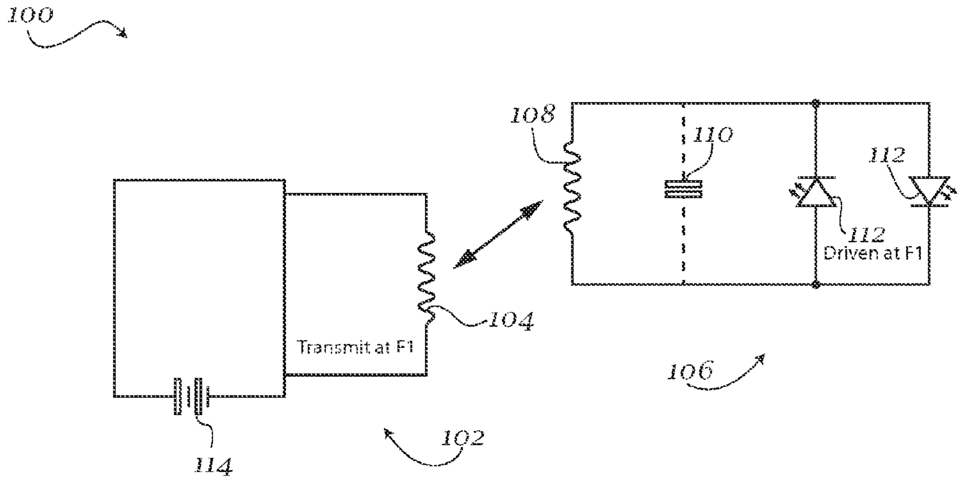
FIG. 1 is an exemplary embodiment of a label.

Turning to FIG. 1, an exemplary embodiment of a label 100 may be shown. Label 100 may include transmitting device 102. Transmitting device 102 may drive some form of a antenna. Suitable types of antennas include dipoles, patches, slots, transmission line structures, horns, loop and antennas, as well as structures such as leaky coaxial cables and other structures. For example, transmitter 102 may drive a antenna 104 at a frequency of F1, in the region between 50 Hz and 50 MHz, where, as the antenna dimensions are chosen to be small relative to the wavelength, the emission from the antenna is primarily in the form of a near magnetic field At higher frequencies, such as those in the region 800 MHz to 1000 MHz, the transmission of energy from transmitter 102 to label 106 may involve either near field coupling, far field coupling or a combination of both. The field produced by transmitting device 102 may also drive one or more receiving labels 106 containing an optical element. In one exemplary embodiment, transmitting device 102 may wirelessly communicate and drive receiving labels 106 by means known to those of ordinary skill in the art. Receiving labels 106 may be for example, labels, tickets or other forms of trim and markings for use in retail products.

Receiving labels 106 may have a receiving antenna, for example receiving antenna 108. Receiving labels 106 may also have resonating capacitor 110 or matching element giving improved power transfer between 102 and 106. Resonating capacitor 110 may be connected to at least one light emitting structure or optical element known to those of ordinary skill in the art such as light emitting diodes, electroluminescent materials, gas discharge devices as well as non emissive structures such as liquid crystal display elements, electrophoretic display elements or combinations of both. The light emitting structures or optical elements may be powered by a battery, other storage device or by receiving energy from a transmitting device. For example, in one exemplary embodiment, as shown in FIG. 1, resonating capacitor 110 may be connected to two light emitting diodes (LEDs) 112 and may receive power from battery 114 of transmitting device 102.

In a further embodiment, transmitter 102 may detect the energy RF energy absorption of label 106 and adjust frequency F1 to maximize power transfer.

In a further embodiment, the emission of label 106 may be either all or partially at wavelengths invisible to human beings, such as infra-red or ultraviolet. The ultraviolet emission may be used to cause effects such as fluorescence from parts of the product where it would be impractical to directly mount the label, for example inside a product. The infra red emission may be well suited to reception by camera systems and allow easy monitoring of how many emitters are present and detection of their removal from proximity to the powering transmitter 102.

Generally referring to the light emitting structures or optical elements of the present invention, these elements may be optionally controlled using the energy from the transmitting device. For example, these elements may be optionally controlled by varying such factors as signal strength, frequency, field orientation or other techniques known to those of ordinary skill in the art. In another exemplary embodiment, a transmitting device may transmit data to an intelligent device, for example a radio frequency identification (RFID) tag, integrated with the optical element, that controls some aspect of the optical emission.

Referring to transmitter 102, the unit may be a standalone structure in the form of a mat or shelf or integrated into a structure designed to hold or contain products. The transmitter may be powered from a continuous supply, such as a buildings main supply, or batteries, either rechargeable or non-rechargeable. The transmitter, and hence any labels 106 in range, may be switched in response to an event or combination of events, such as the time of day, presence or absence of light or detection of a person by mean such as a passive infra-red detector. Depending on the frequency F1 used to transfer energy from transmitter 102 to receiving elements 105, the transmitter may be on the opposite side of a fixed structure such as a wall or door, allowing an optical emitter to be powered without the use of wiring.

Returning to FIG. 1, the effective capacitance of LEDs 112 may be arranged to be resonant at a first frequency, F1, with receiving antenna 108. The exemplary use of the two LEDs 112 may allow optical output in both positive and negative cycles of the received signal, F1. Additionally, the use of the two LEDs may limit the reverse voltage seen by either LED 112 to the forward voltage of LEDs 112. This arrangement may be used to prevent damage to receiving label 106, for example, by preventing avalanche conduction.

Figure 2:
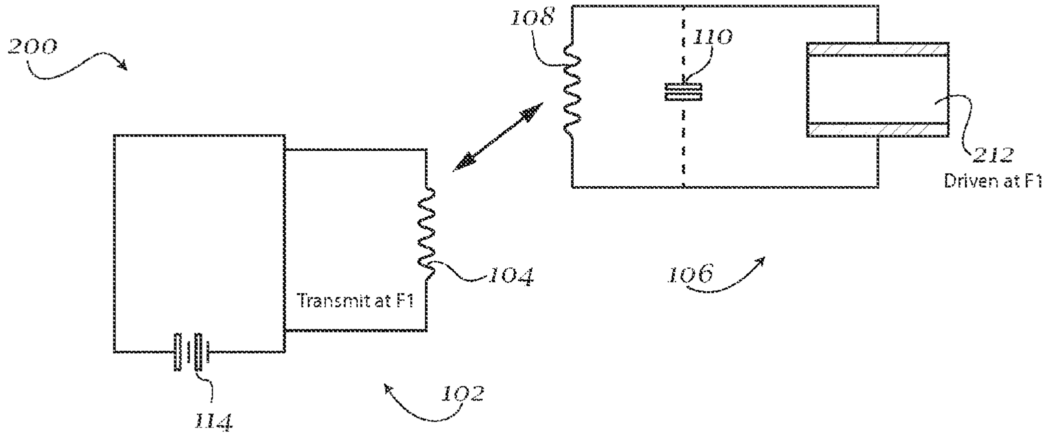
FIG. 2 is another exemplary embodiment of a label.

Turning to FIG. 2, another exemplary embodiment of a label 200 may be shown. This embodiment is similar in form and operation to the embodiment shown in FIG. 1 and described above. However an alternative optical element, for example, an electro-luminescent panel (EL) 212 may be shown.

Electro-luminescent panel 212 may be either a direct current (DC) or alternating current (AC) panel. In one embodiment, electro-luminescent panel 212 may utilize an AC signal drive at frequencies between, for example, 100 Hz and 40 kHz. The capacitance of electro-luminescent panel 212 may be resonated with receiving antenna 108 at a first frequency, F1. Transmitting device 102 may also be set to first frequency F1. When in proximity to transmitting antenna 104, a high voltage at F1 may be generated across electro-luminescent panel 212, which may cause electro-luminescent panel 212 to emit light.

Figure 3:
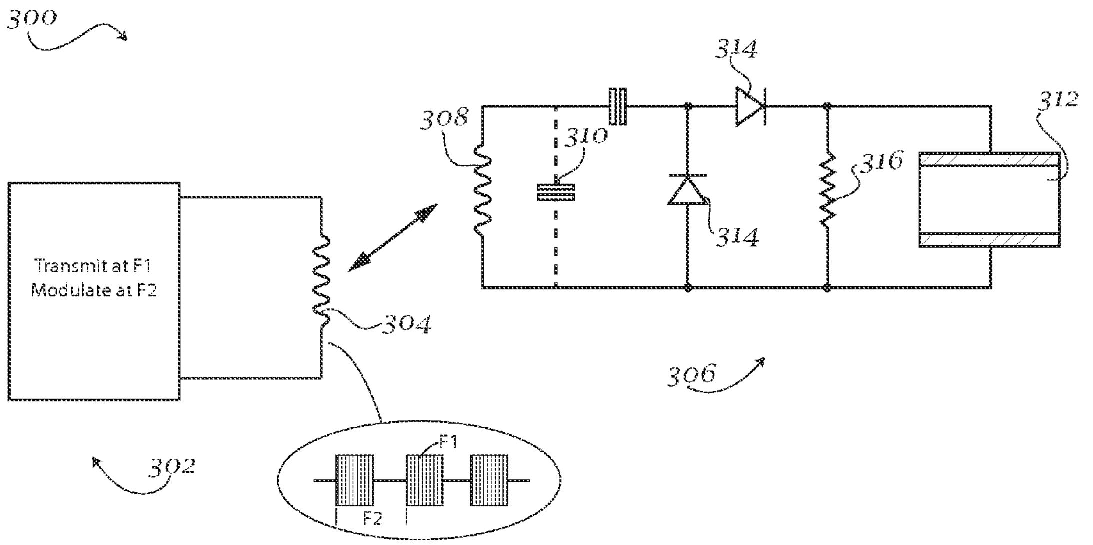
FIG. 3 is another exemplary embodiment of a label.

Turning to FIG. 3, another exemplary embodiment of a label 300 may be shown, where energy may be delivered at a relatively high frequency. Label 300 may have transmitting device 302, transmitting antenna 304, receiving label 306, receiving antenna 308 and electro-luminescent panel 312. Energy may be delivered at a relatively high first frequency, F1, for example about 13.56 MHz, but with this drive energy modulated at a second frequency, F2, typically between 50 Hz and 20 kHz. Label 300 may also have rectifier diodes 314 and resistive load 310 on receiving label 306. The energy at first frequency F1 may be rectified and the output of the rectifier and AC signal at second frequency F2 may be used to drive electro-luminescent panel 312. Alternatively, in another exemplary embodiment, the rectified energy may be used to drive an oscillator, boost voltage converter or the like. Any of the components of label 300 may be implemented using organic or inorganic semiconductor devices, for example, printed amorphous silicon, doped polyaniline, or like materials.

Figure 4A:
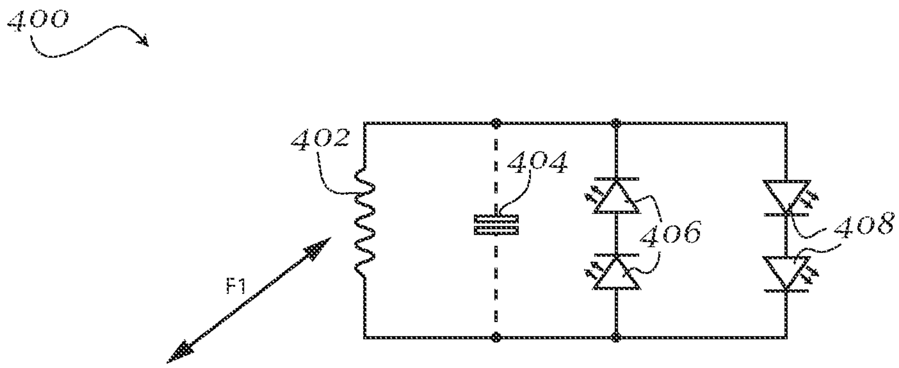
FIG. 4*a* is an exemplary embodiment of a receiving label with a series-parallel arrangement of diodes.

Turning now to FIG. 4*a*, an exemplary embodiment of a receiving label 400 with a series-parallel arrangement of diodes may be shown. This arrangement may allow more parts to be driven from the same antenna. Receiving label 400 may have receiving antenna 402 and capacitor 404. Receiving label 400 may have a first pair of diodes 406 connected in series, and a second pair of diodes 408 connected in series. First pair of diodes 406 may be connected in parallel to second pair of diodes 408. The total capacitance of first pair of diodes 406 and second pair of diodes 408 may be approximately half that of a single pair of diodes. Thus, receiving antenna 402 may need to be modified to maintain resonance at first frequency, F1.

Figure 4B:
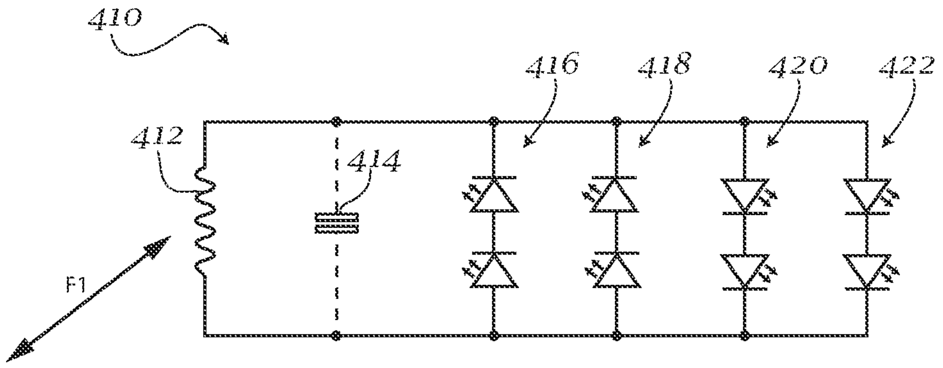
FIG. 4*b* is another exemplary embodiment a receiving label with a series-parallel arrangement of diodes.

Turning now to FIG. 4*b*, another exemplary embodiment of a receiving label 410 with a series-parallel arrangement of diodes may be shown. Receiving label 410 may have receiving antenna 412 and capacitor 414. Receiving label 410 may have a first pair of diodes 416 arranged in series, a second pair of diodes 418 arranged in series, a third pair of diodes 420 arranged in series, and a fourth pair of diodes 422 arranged in series. Each of the first pair of diodes 416, second pair of diodes 418, third pair of diodes 420 and fourth pair of diodes 422 may be connected in parallel to one another. In this arrangement, the combination of eight diodes may give approximately the same capacitance as two diodes and thus the same receiving antenna 412 may be used to maintain resonance at first frequency F1.

Figure 5:
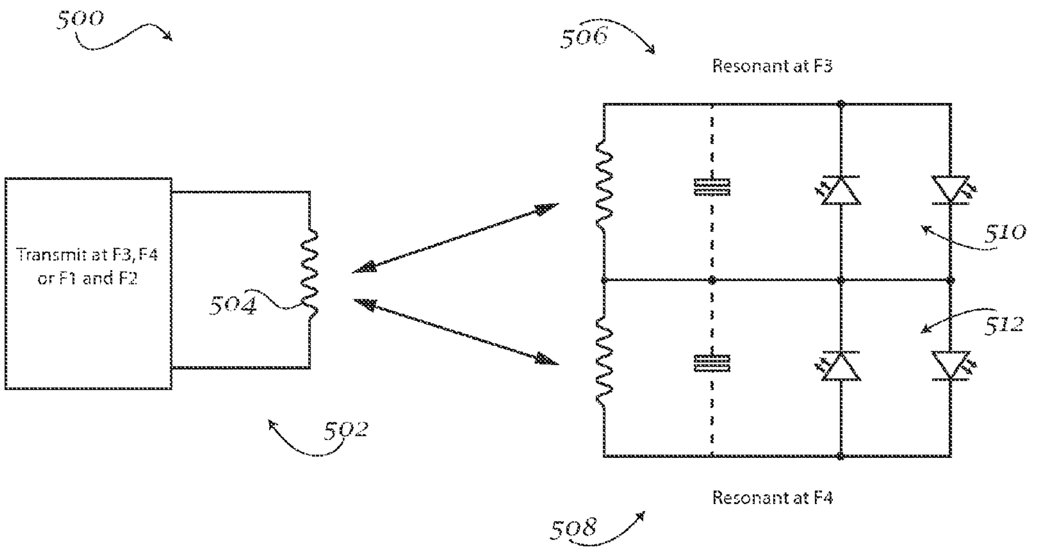
FIG. 5 is another exemplary embodiment of a label.

Turning now to FIG. 5, another exemplary embodiment of a label 500 may be shown. Label 500 may include transmitting device 502. Transmitting device 502 may drive some form of a distributed near field antenna. For example, transmitter 502 may drive transmitter antenna 504. Transmitting device 502 may also drive two or more receiving labels, for example, first receiving label 506, and second receiving label 508. Each of the two or more receiving antennas may be connected to a set of LEDs. For example, first receiving label 506 may have first set of LEDs 510 and second receiving label 508 may have second set of LEDs 512. Each set of LEDs may be a different color. For example, first set of LEDs 510 may be red and second set of LEDs 512 may be green.

First receiving label 506 and second receiving label 508 may be tuned to different frequencies. For example, first receiving label 506 may be resonant at third frequency F3 and second receiving label 508 may be resonant at fourth frequency F4. Transmitting device 502 may at least transmit energy at third frequency F3, fourth frequency F4, or both. If transmitting device 502 transmits energy at third frequency F3, first receiving label 506 may react by turning on first set of LEDs 510. If transmitting device 502 transmits energy at fourth frequency F4, second receiving label 508 may react by turning on second set of LEDs 512. If transmitting device 502 transmits energy at both third frequency F3 and fourth frequency F4, both first set of LEDs 510 and second set of LEDs 512 may be turned on. Furthermore, if the relative field strength is adjusted, a range of colors may be produced.

It should be recognized by those skilled in the art that additional receiving labels that resonant at different frequencies and with different color LEDs are within the scope of the claimed subject matter. Thus, still referring to FIG. 5, if three sets of LEDs were used, for example, with the colors red, green and blue, white light may be synthesized. Alternatively, instead of frequency multiplexing, the color outputs of the multiple receiving labels may be achieved by changing the angle of the field. For example, if the antenna associated with first receiving label 506 (with red LEDs) and the antenna associated with second receiving label 508 (with green LEDs) are at approximately 90 degrees to one another, altering the relative vector of the magnetic flux so that one is at approximately 0 degrees and the other at approximately 90 degrees, or by using an angle of approximately 45 degrees for both, variable control of label 500 may be achieved.

Figure 6:
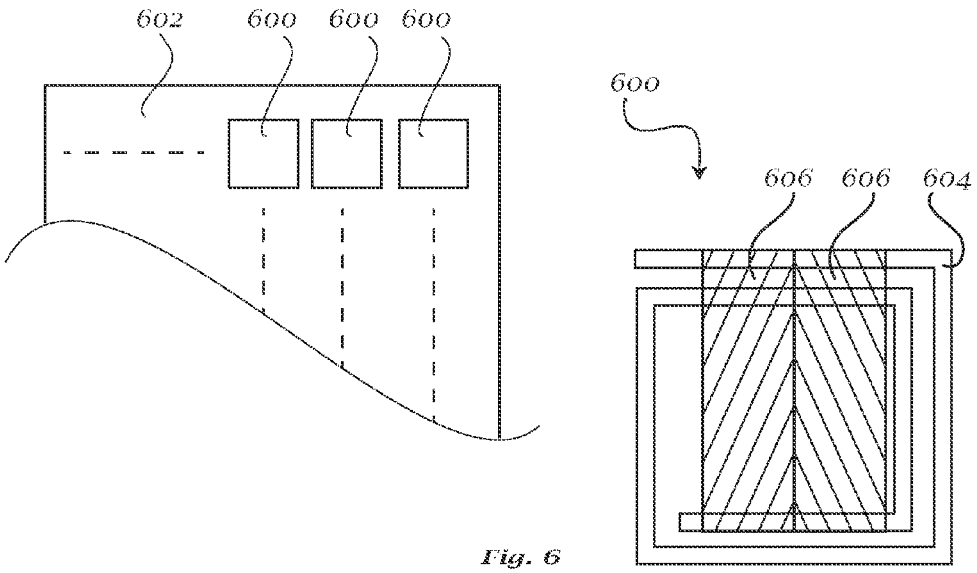
FIG. 6 is an exemplary embodiment of a plurality of light cells disposed on a roll.

Turning now to FIG. 6, a configuration for a web material suitable for mass production of a plurality of light cells 600 on a roll 602 may be shown. Light cells 600 may be disposed as a series of individual resonator and light emitting elements in grid form on roll 602 as shown. Each light cell 600 may have a antenna 604 and light emitting elements 606.

Antennas 604 may be formed, for example, by etching, laser ablation of unwanted material, or other suitable methods known to those skilled in the art. The light emitting elements 606 may be printed on the antennas 604. The roll 602 may be a material that is used to form labels that have an optical output by, for example, die cutting between the light cells 600. Graphics may be added by printing, merging with a printable translucent plastic or paper, or by other known methods. In one exemplary embodiment, the individual light cells 600 may have an interconnection between them that, when cut, may modify the tuning of each light cell 600. Furthermore, modifications may be made to compensate for light cells 600 on the edge of roll 602 to compensate for these cells not interacting with other cells on all sides.

It should be recognized by those skilled in the art that for the above circuit arrangements, a number of types of emissive display elements may be used. For example, LEDs, printed AC or DC electroluminescent materials, organic light emitting diodes (OLEDs), polymer light emitting diodes or the like may be utilized by the present invention. Furthermore, the above circuit arrangements may be formed in a number of ways, for example by printing or other known methods to create thin, flexible labels.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of variably controlling the optical output of a label comprising:

arranging the capacitance of a first optical element to be resonant with a first receiving antenna of a receiving label at a first frequency and arranging the capacitance of a second optical element to be resonant with a second receiving antenna of the receiving label at a second frequency;

transmitting energy from a remote transmitting device at said first frequency and at said second frequency;

receiving energy from the transmitting device at the first receiving antenna at said first frequency to activate the first optical element and receiving energy from the transmitting device at the second receiving antenna at the second frequency to activate the second optical element; and selectively controlling the output of the first and second optical element by varying factors associated with the energy transmitted by the transmitting device.

2. The method of claim 1, wherein the transmitting device includes at least one transmitting antenna and a power source; and wherein at least one optical element is controlled and powered to emit light using energy transmitted by the transmitting device.

3. The method of claim 1, wherein:

the first and second optical elements eac include at least one of a light emitting diode (LED), a pair of light emitting diodes, a printed alternating current (AC) electroluminescent panel, a printed direct current (DC) electroluminescent panel, organic light emitting diode (OLED), and polymer light emitting diode.

4. The method of claim 1, wherein:

each of the optical elements emits a different color light.

5. The method of claim 1, wherein the receiving label is a radio frequency identification (RFID) label.

6. The method of claim 1, wherein at least one optical element, further comprises an intelligent element integrated with the optical element.

7. The method of claim 6, wherein:

the intelligent element is a radio frequency identification (RFID) chip.

8. The method claim 1, wherein:

the varying factors include at least one of signal strength, frequency and field orientation.

* * * * *